(12) United States Patent
Ochiai et al.

(10) Patent No.: US 7,415,776 B2
(45) Date of Patent: Aug. 26, 2008

(54) MAGNETIC SCALE

(75) Inventors: Osamu Ochiai, Kanagawa (JP); Yuji Nagai, Kanagawa (JP); Masayuki Shibata, Tokyo (JP); Hideo Maejima, Kanagawa (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 11/397,223

(22) Filed: Apr. 4, 2006

(65) Prior Publication Data
US 2006/0226831 A1 Oct. 12, 2006

(30) Foreign Application Priority Data
Apr. 7, 2005 (JP) ............................ P2005-110518

(51) Int. Cl.
*G01B 7/00* (2006.01)
(52) U.S. Cl. .................... 33/708; 33/706; 33/DIG. 1; 324/207.24
(58) Field of Classification Search ................ 33/708, 33/706, DIG. 1; 324/207.24
See application file for complete search history.

(56) References Cited

U.S. PATENT DOCUMENTS

| | | | |
|---|---|---|---|
| 4,523,381 A * | 6/1985 | Narimatsu et al. ............ 33/706 |
| 6,308,431 B1 * | 10/2001 | Takanashi et al. ............. 33/708 |
| 6,612,048 B2 * | 9/2003 | Peterlechner et al. ......... 33/706 |
| 6,670,806 B2 * | 12/2003 | Wendt et al. ........... 324/207.24 |
| 6,690,160 B2 * | 2/2004 | Gray et al. ............. 324/207.24 |
| 6,856,477 B2 * | 2/2005 | Morimoto .............. 324/207.24 |
| 7,051,639 B2 * | 5/2006 | Krone et al. ........... 324/207.24 |
| 7,353,618 B2 * | 4/2008 | Shibata et al. ................. 33/708 |
| 2006/0220637 A1 * | 10/2006 | Shibata et al. ......... 324/207.13 |
| 2007/0220772 A1 * | 9/2007 | Kato et al. ..................... 33/708 |

* cited by examiner

*Primary Examiner*—Yaritza Guadalupe-McCall
(74) *Attorney, Agent, or Firm*—Robert J. Depke; Rockey, Depke & Lyons, LLC.

(57) ABSTRACT

A magnetic scale is disclosed wherein a magnetic member is protected with certainty to effectively enhance the durability. The magnetic scale includes a magnetic member provided between outside and inside pipe members and has magnetic graduations magnetized alternately with the N and S poles along the extending direction thereof. When the magnetic member and the inside pipe member are assembled in the outside pipe member, the inside pipe member contacts partly with an inner face of the outside pipe member and partly with a back face of the magnetic member in such a manner as to cover the overall back face. The outer face of the inside pipe member presses the back face of the magnetic member over the overall length so that the close contact face of the magnetic member is closely contacted with the inner face of the outside pipe member.

25 Claims, 12 Drawing Sheets

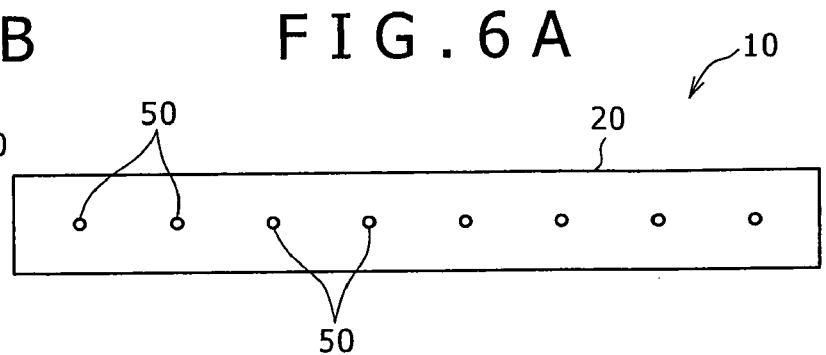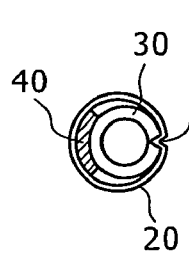
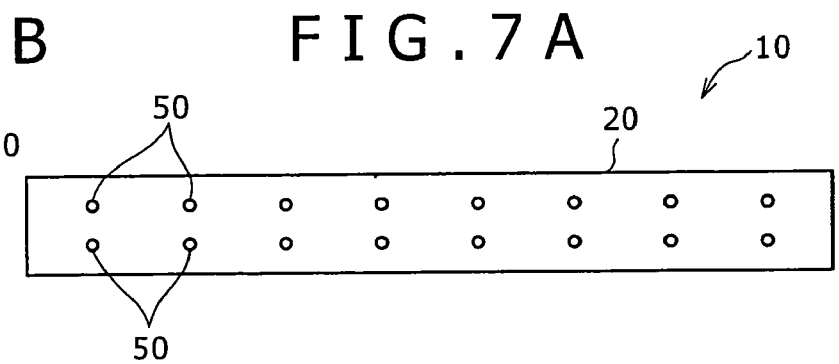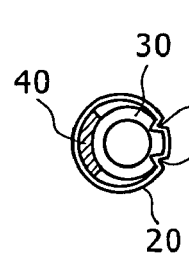
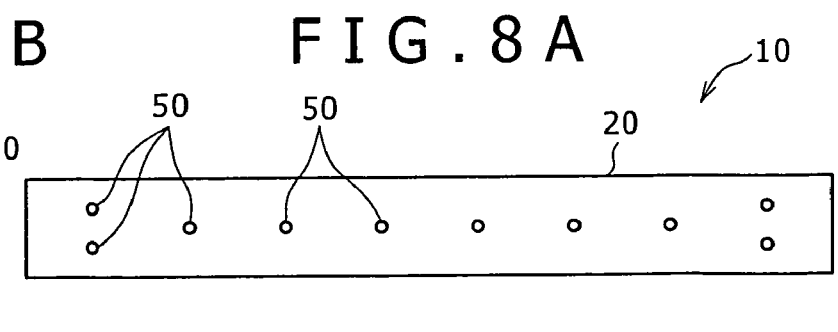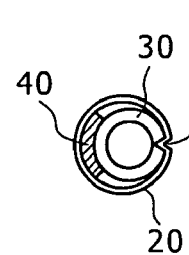

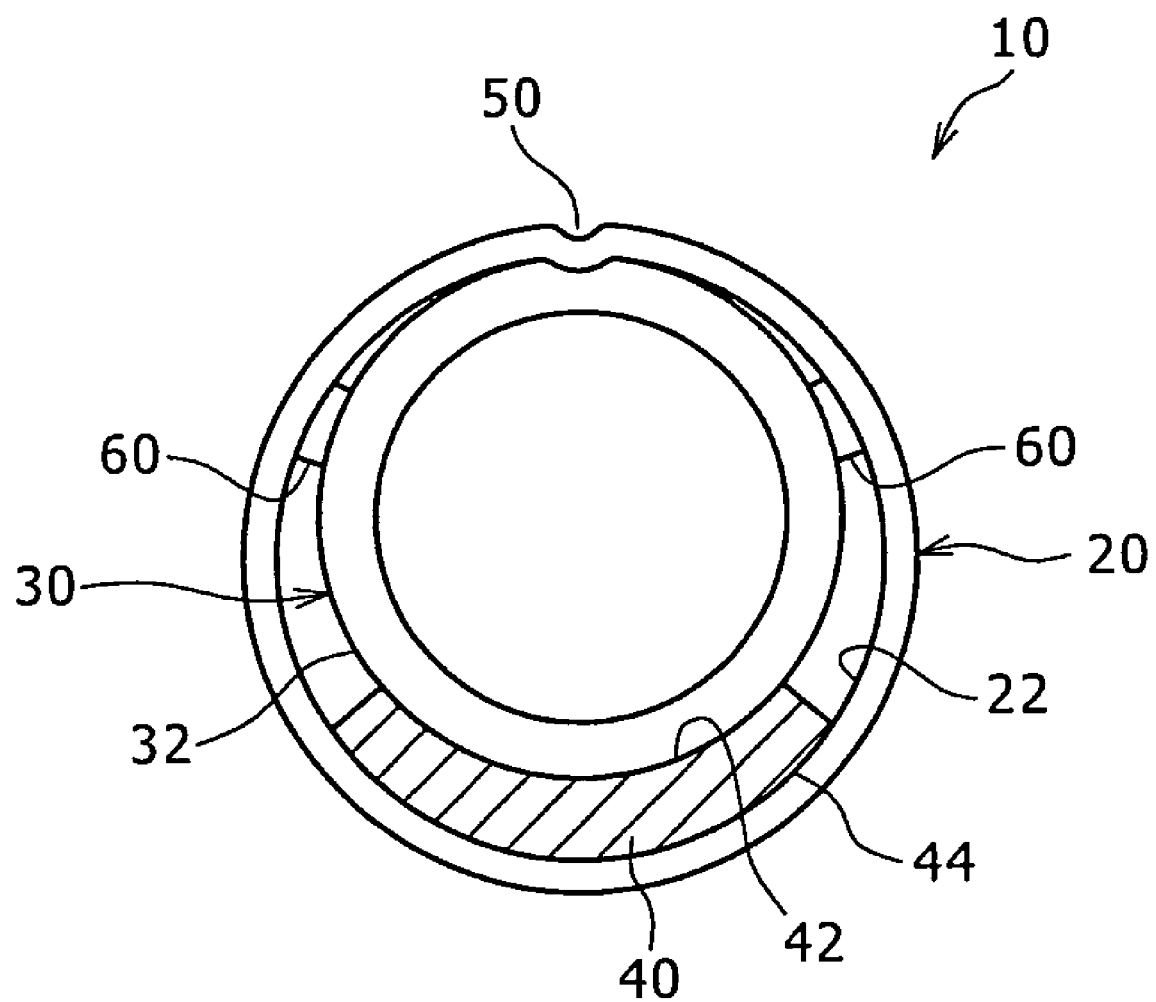

MAGNETIC SCALE

CROSS REFERENCES TO RELATED APPLICATIONS

The present invention contains subject matter related to Japanese Patent Application JP 2005-110518 filed with the Japanese Patent Office on Apr. 7, 2005, the entire contents of which being incorporated herein by reference.

BACKGROUND OF THE INVENTION

This invention relates to a magnetic scale for use for position detection.

A position detection apparatus for detecting the position of a print head of a printer is known and disclosed, for example, in Japanese Patent Laid-open No. Sho 62-226007 (hereinafter referred to as Patent Document 1).

The position detection apparatus disclosed in Patent Document 1 includes a magnetic scale which in turn includes a guide shaft for guiding a print head. The guide shaft has magnetic graduations provided on an outer peripheral face along a longitudinal direction thereof. The position detection apparatus further includes a magnetic sensor provided integrally on the print head for detecting a variation of the magnetic field of the magnetic graduations and outputting a detection signal.

In the position detection apparatus, the position of the print head in the longitudinal direction of the guide shaft is obtained based on the detection signal.

Such a position detection apparatus which uses a magnetic scale as described above is applied widely to various machine tools, printers and automatic machines in which position detection is required.

SUMMARY OF THE INVENTION

Incidentally, in the position detection apparatus described above, a magnetic member of the magnetic scale is exposed outwardly. Therefore, where the position detection apparatus is attached, for example, to a machine tool, there is the possibility that some article may collide with and damage the magnetic member or cutting fluid may stick to and degrade the magnetic member. In this regard, the position detection apparatus is disadvantageous in assurance of the durability of the magnetic scale.

There is a need for the present invention to provide a magnetic scale wherein a magnetic member is protected with certainty to effectively enhance the durability.

In order to satisfy the need described above, according to an embodiment of the present invention, there is provided a magnetic scale including an outside pipe member, an inside pipe member inserted in the inside of the outside pipe member, and a magnetic member having a close contact face capable of closely contacting with an inner face of the outside pipe member and extending linearly, the magnetic member being inserted in a gap between the inner face of the outside pipe member and an outer face of the inside pipe member in such a manner as to extend in parallel to a longitudinal direction of the outside pipe member, the magnetic member having the magnetic graduation formed thereon and magnetized alternately with the N poles and the S poles thereon along the extending direction thereof, the inside pipe member pressing the magnetic member so that the close contact face of the magnetic member is closely contacted with the inner face of the outside pipe member.

According to another embodiment of the present invention, there is provided a magnetic scale including an outside pipe member, an inside pipe member inserted in the inside of the outside pipe member, a magnetic member having a close contact face capable of closely contacting with an inner face of the outside pipe member and extending linearly, the magnetic member being inserted in a gap between the inner face of the outside pipe member and an outer face of the inside pipe member in such a manner as to extend in parallel to a longitudinal direction of the outside pipe member, the magnetic member having the magnetic graduation formed thereon and magnetized alternately with the N poles and the S poles thereon along the extending direction thereof, and a resilient member provided remotely from the magnetic member in the gap for resiliently pressing the inside pipe member in a direction in which the close contact face of the inside pipe member is closely contacted with the inner face of the outside pipe member.

In the magnetic scales, a magnetic member having magnetic graduations formed thereon is provided in the inside of an outside pipe member, and a close contact face of the magnetic member is closely contacted with an inner face of the outside pipe member by an inside pipe member.

Accordingly, with the magnetic scales, the magnetic member can be protected by the outside pipe member, and such a situation that some article collides with and damages the magnetic member or cutting fluid sticks to and degrades the magnetic member can be prevented. Consequently, the durability of the magnetic scale can be assured advantageously.

Further, the magnetic scale can be assembled simply through the use of the inside pipe member.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6A is a plan view showing an example of arrangement of recessed portions formed on an outside pipe member of the magnetic scale shown in FIG. 5A, and FIG. 6B is a cross sectional view of the magnetic scale of FIG. 6A;

FIG. 7A is a plan view showing another example of arrangement of the recessed portions formed on the outside pipe member of the magnetic scale of FIG. 5A, and FIG. 7B is a cross sectional view of the magnetic scale of FIG. 7A;

FIG. 8A is a plan view showing a further example of arrangement of the recessed portions formed on the outside pipe member of the magnetic scale of FIG. 5A, and FIG. 8B is a cross sectional view of the magnetic scale of FIG. 5A;

FIG. 9 is a cross sectional view of a magnetic scale according to a sixth embodiment of the present invention;

DETAILED DESCRIPTION OF THE PREFERRED EMBODIMENTS

First Embodiment

Now, a first embodiment of the present invention is described with reference to the drawings.

Figure 1A:
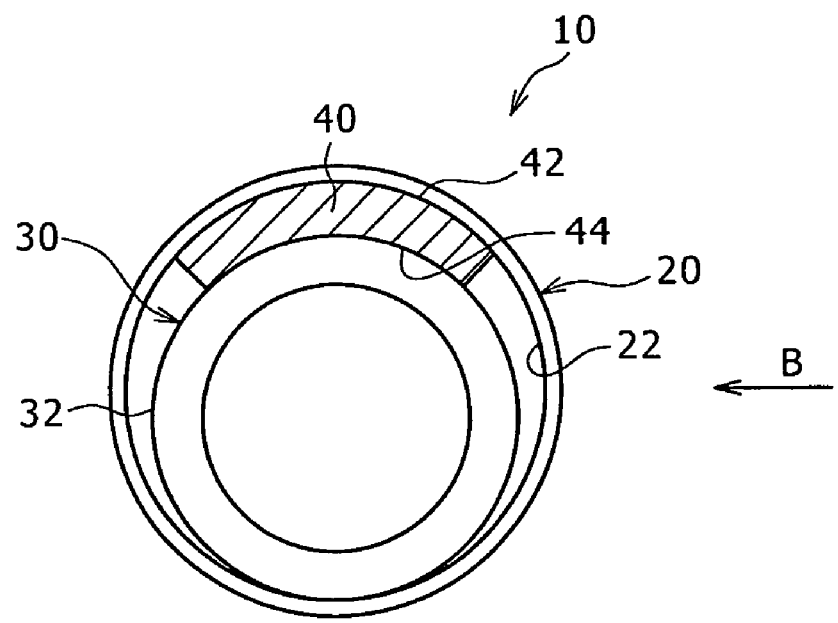
FIG. 1A is a cross sectional view of a magnetic scale according to a first embodiment of the present invention.
Figure 1B:
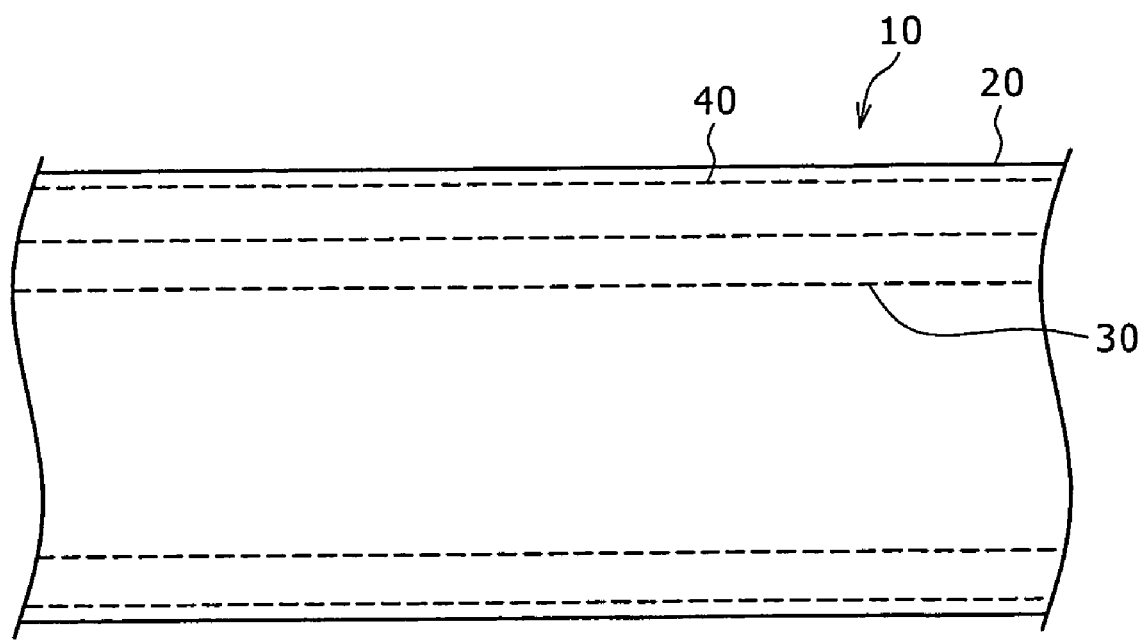
FIG. 1B is a view of the magnetic scale of FIG. 1A as viewed in the direction indicated by an arrow mark B.

FIG. 1A is a cross sectional view of a magnetic scale according to the first embodiment of the present invention, and FIG. 1B is a view of the magnetic scale of FIG. 1A as viewed in the direction indicated by an arrow mark B.

Figure 2A:
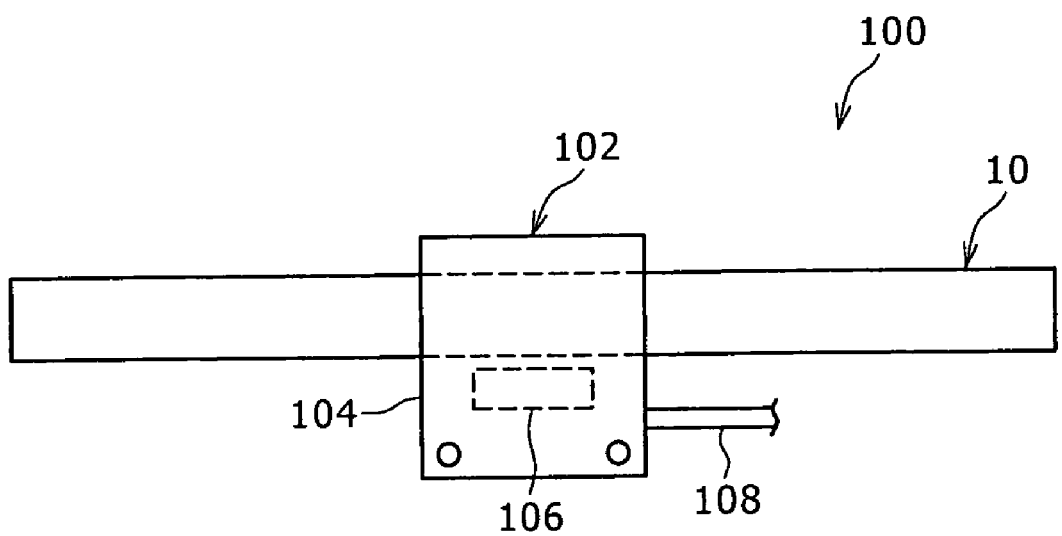
FIG. 2A is a schematic view showing a configuration of a position detection apparatus in which the magnetic scale of FIG. 1A is used.

Further, FIG. 2A is a schematic view showing a configuration of a position detection apparatus in which the magnetic scale of FIG. 1A is used.

Referring first to FIG. 2A, there is shown a position detection apparatus 100 in which a magnetic scale according to the first embodiment of the present invention is used.

The position detection apparatus 100 includes a magnetic scale 10, and a detection head 102 for being guided for movement in an extending direction of the magnetic scale 10 by the magnetic scale 10.

Referring now to FIG. 1A, the magnetic scale 10 includes an outside pipe member 20, an inside pipe member 30 inserted in the inside of the outside pipe member 20, and a magnetic member 40 disposed between the outside pipe member 20 and the inside pipe member 30.

The outside pipe member 20 has a tubular configuration having a ring-shaped cross section and has an inner face 22.

The outside pipe member 20 is formed from a material which does not have a magnetic influence on the magnetic force of the magnetic member 40.

In the present invention, as the material of the outside pipe member 20, the stainless steel SUS304 (JIS) which is a kind of non-magnetic material is used. It is to be noted that the outside pipe member 20 may be formed otherwise from a material having some weak magnetism only if it does not have a magnetic influence on the magnetic force of the magnetic member 40. Further, in the other embodiments of the present invention hereinafter described, the outside pipe member 20 is made of a material similar to that in the first embodiment.

The magnetic member 40 is in the form of a band plate having an arcuate cross section, and one of the opposite faces thereof in the thicknesswise direction is formed as a close contact face 42 which can closely contact with the inner face 22 of the outside pipe member 20 while the other face is formed as a back face 44 which can closely contact with an outer face 32 of the inside pipe member 30.

The magnetic member 40 is inserted in a gap between the inner face 22 of the outside pipe member 20 and the outer face 32 of the inside pipe member 30 such that it extends linearly in parallel to the longitudinal direction of the outside pipe member 20. The magnetic member 40 has magnetic graduations formed along the extending direction thereof and magnetized alternately with the N pole and the S pole.

The magnetic member 40 is made of a magnetizable material, and the magnetic graduations are formed by magnetizing the magnetic member 40 at a fixed pitch alternately with the N pole and the S pole along the extending direction of the magnetic member 40. In other words, the magnetic graduations are formed on the magnetic member 40 such that they include a cyclic signal which varies alternately between the N pole and the S pole along the extending direction of the magnetic member 40. Further in other words, a cyclic magnetic pattern which varies alternately between the N pole and the S pole along the extending direction of the magnetic member 40 is recorded on the magnetic member 40.

The magnetic member 40 in the present embodiment is formed from a rubber magnet made of a resilient material.

The inside pipe member 30 is formed as a cylindrical member having a ring-shaped cross section and has the outer face 32.

The inside pipe member 30 may be inserted into the inside of the outside pipe member 20 after the magnetic member 40 is assembled to the inner face 22 of the outside pipe member 20 (in this instance, a bonding agent or a double-sided adhesive tape is used or any other arbitrary assembling method may be used). Or, the inside pipe member 30 may be inserted into the outside pipe member 20 after the magnetic member 40 is assembled to the inside pipe member 30 (also in this instance, a bonding agent or a double-sided adhesive tape is used or any other arbitrary assembling method may be used).

Where the magnetic member 40 and the inside pipe member 30 are assembled to the inside of the outside pipe member 20, the inside pipe member 30 contacts at a portion of the outer face 32 on one side thereof with the inner face 22 of the outside pipe member 20 and contacts at another portion of the outer face 32 on the other side thereof, which opposes to the portion on the one side, such that the outer face 32 covers over the overall area of the back face 44 of the magnetic member 40. Consequently, the outer face 32 of the inside pipe member 30 contacts with and presses against the back face 44 of the magnetic member 40 over the overall area so that the close contact face 42 of the magnetic member 40 is closely contacted with the inner face 22 of the outside pipe member 20.

The inside pipe member 30 is formed from a material with which the magnetic force of the magnetic member 40 is exhibited effectively. More particularly, the material of the inside pipe member 30 raises the magnetic field strength of the magnetic member 40 to raise the surface magnetic flux density on the outer face of the outside pipe member 20, and a magnetic material such as iron can be used as the material of the inside pipe member 30. It is to be noted that, also in the other embodiments of the present invention hereinafter described, the inside pipe member 30 is made of a material similar to that in the first embodiment.

The magnetization of the magnetic member 40, that is, the formation of the magnetic graduations, is performed using a magnetization apparatus for exclusive use.

The magnetization apparatus includes a magnetic head, and a drive circuit for supplying driving current to the magnetic head so that a magnetic field is generated from the magnetic head.

The magnetization apparatus magnetizes the magnetic member 40 with the N pole and the S pole at a fixed pitch to form magnetic graduations by moving the magnetic head relatively along the longitudinal direction of the inside pipe member 30 with the magnetic head opposed to the magnetic member 40 while a magnetic field is applied from the magnetic head to the magnetic member 40.

It is to be noted that formation of the magnetic graduations on the magnetic member 40 may be performed otherwise by opposing, after the magnetic member 40 is attached to the inner face 22, the magnetic head to the outer face of the outside pipe member 20 and applying the magnetic field from the magnetic field to the magnetic member 40 through the outside pipe member 20. Or, the formation of the magnetic graduations may be performed by opposing the magnetic head directly to the magnetic member 40 before the magnetic member 40 is attached to the outside pipe member 20.

It is to be noted, however, that, where the magnetic graduations are formed after the magnetic member 40 is attached to the inner face 22 of the outside pipe member 20, the error in assembly of the magnetic member 40 to the inner face 22 and a possible influence of deformation of the outside pipe member 20 upon the pitch of the N poles and the S poles of the magnetic member 40 can be eliminated. Therefore, when compared with the alternative formation of the magnetic graduations on the magnetic member 40 by itself, the formation of the magnetic graduations after the attachment of the magnetic member 40 is more advantageous in that the accuracy of the magnetic graduations can be assured with a higher degree of accuracy and a detection signal can be detected with a higher degree of accuracy by the detection head 102 (refer to FIG. 2A).

Further, where the inside pipe member 30 is formed from such a material with which the magnetic force is exhibited with a high degree of accuracy as described above, upon magnetization of the magnetic member 40, the magnetic member 40 can be magnetized strongly when compared with an alternative case wherein such an inside pipe member 30 as just described is not used. Therefore, there is an advantage that the magnetic field strength of the magnetic member 40 can be raised thereby to raise the surface magnetic flux density on the outer face of the outside pipe member 20.

Referring to FIG. 2A, the detection head 102 includes a slide base 104 and a magnetic sensor 106.

The slide base 104 has a bearing in which the outside pipe member 20 is fitted, and is supported for sliding movement in the extending direction of the outside pipe member 20 through the bearing.

The magnetic sensor 106 is incorporated in the slide base 104 and disposed in such a manner as to oppose to the magnetic member 40 of the magnetic scale 10 with a fixed distance left therebetween.

The magnetic sensor 106 detects a magnetic field and outputs a detection signal corresponding to the strength of the magnetic field. In the present embodiment, a magnetic reluctance element (MR sensor) is used as the magnetic sensor 106. The magnetic reluctance element has electric resistance which varies in response to the variation of the magnetic field applied to the magnetic reluctance element.

Accordingly, if the detection head 102 detects the magnetic graduations while it moves along the extending direction of the outside pipe member 20, then a detection signal which varies periodically (for example, like a sine wave) can be obtained from the magnetic sensor 106.

Such a detection signal as just described is supplied from the magnetic sensor 106 to a known detection circuit through a lead 108, and a relative displacement of the detection head 102 with respect to the magnetic scale 10 is detected by the detection circuit.

According to the magnetic scale 10 of the present embodiment, the magnetic member 40 having the magnetic graduations formed thereon is provided in the inside of the outside pipe member 20, and the close contact face 42 of the magnetic member 40 is contacted closely with the inner face 22 of the outside pipe member 20 by the inside pipe member 30.

Accordingly, with the magnetic scale 10 of the present embodiment, since the magnetic member 40 having the magnetic graduations formed thereon is provided in the inside of the outside pipe member 20, the magnetic member 40 can be protected by the outside pipe member 20, and such a situation that some article collides with and damages the magnetic member 40 or cutting fluid sticks to and degrades the magnetic member 40 can be prevented. Consequently, the durability of the magnetic scale 10 can be assured advantageously.

Further, since the inside pipe member 30 is inserted in the inside of the magnetic member 40, the magnetic scale 10 can be assembled simply and magnetic fluxes generated by the magnetic member 40 can be radiated efficiently toward the outer face of the outside pipe member 20 thereby to raise the surface magnetic flux density on the outer face of the outside pipe member 20. Consequently, where such a magnetic scale 10 as just described is incorporated in the position detection apparatus 100, a sufficiently high voltage level of the detection signal detected by the magnetic sensor 106 of the detection head 102 can be assured advantageously.

Further, since reduction in weight can be anticipated and the rigidity of the magnetic scale 10 can be raised by the inside pipe member 30 disposed in the inside of the outside pipe member 20, the rigidity of the magnetic scale 10 can be assured. Further, where the outside pipe member 20 is reduced in thickness, a greater part of magnetic fluxes generated by the magnetic member 40 can be radiated toward the outer face of the outside pipe member 20. Consequently, the surface magnetic flux density on the outer face of the outside pipe member 20 can be further raised, and as a result, where the magnetic scale 10 is incorporated in the position detection apparatus 100, a sufficiently high voltage level to be detected by the magnetic sensor 106 of the detection head 102 can be assured more advantageously.

Further, with the magnetic scale 10 of the present embodiment, since the inside pipe member 30 made of a magnetic material covers over the overall area of the back face 44 of the magnetic member 40, the magnetic field strength of the magnetic member 40 can be raised thereby to further raise the surface magnetic flux density on the outer face of the outside pipe member 20. Consequently, where the magnetic scale 10 is incorporated in the position detection apparatus 100, a sufficiently high voltage level to be detected by the magnetic sensor 106 of the detection head 102 can be assured more advantageously.

Further, where the magnetic scale 10 is used in the position detection apparatus 100 as in the present embodiment, since the magnetic member 40 is provided in the inside of the outside pipe member 20, the outside pipe member 20 can be used also as a guide member for supporting the detection head 102 for sliding movement. Consequently, when compared with an alternative arrangement wherein the guide member is provided separately, the cost can be reduced and miniaturization can be anticipated advantageously.

Figure 2B:
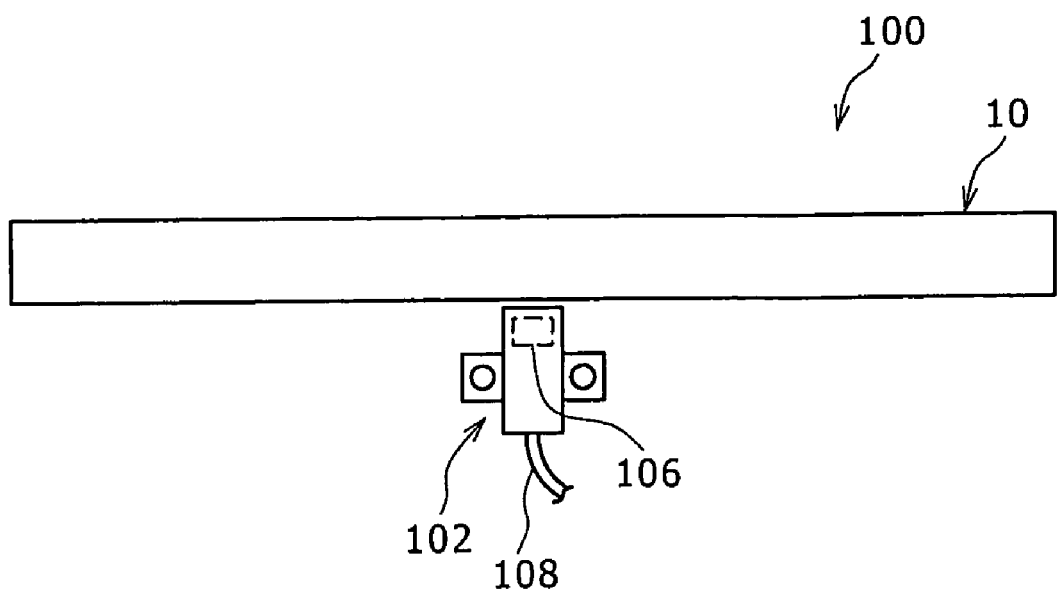
FIG. 2B is a schematic view showing a configuration of another position detection apparatus in which the magnetic scale of FIG. 1A is used.

It is to be noted that the magnetic scale 10 is not restrictively applied to the position detection apparatus 100 wherein the detection head 102 is incorporated in the outside pipe member 20 as described hereinabove with reference to FIG. 2A but can be applied also to another position detection apparatus 100 of the separate type wherein the detection head 102 is not supported for sliding movement on the outside pipe member 20 but is provided separately from the outside pipe member 20 as shown in FIG. 2B.

Second Embodiment

Now, a second embodiment of the present invention is described.

Figure 3:
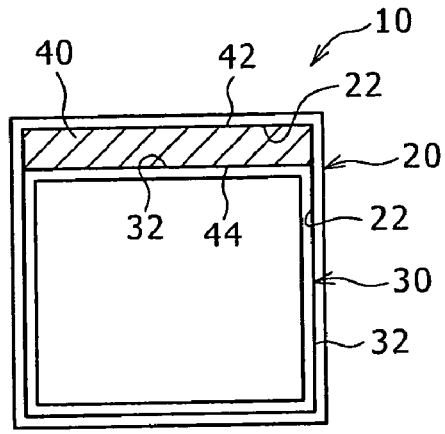
FIG. 3 is a cross sectional view of a magnetic scale according to a second embodiment of the present invention.

FIG. 3 is a cross sectional view of a magnetic scale of the second embodiment.

The magnetic scale of the second embodiment is similar to the magnetic scale of the first embodiment described hereinabove except that only the outside pipe member 20, inside pipe member 30 and magnetic member 40 are different in shape.

In particular, the outside pipe member 20 has a cross section of a rectangular framework shape and is made of a nonmagnetic material such as the stainless steel SUS304 (JIS) which does not have a magnetic influence on the magnetic force of the magnetic member 40 similarly as in the first embodiment.

The inside pipe member 30 has a cross section of a rectangular framework shape and is made of a magnetic material such as iron with which the magnetic force of the magnetic member 40 is exhibited effectively similarly as in the first embodiment.

The magnetic member 40 is in the form of a band plate having a rectangular cross section and is provided in a horizontally elongated rectangular space defined by the inner face 22 of the outside pipe member 20 and the outer face 32 of the inside pipe member 30.

The inside pipe member 30 may be inserted into the inside of the outside pipe member 20 after the magnetic member 40 is assembled to the inner face 22 of the outside pipe member 20, or the inside pipe member 30 may be inserted into the outside pipe member 20 after the magnetic member 40 is assembled to the inside pipe member 30 similarly as in the first embodiment.

Where the magnetic member 40 and the inside pipe member 30 are assembled in the inside of the outside pipe member 20, the inside pipe member 30 contacts at a portion of the outer face 32 along one side of the rectangular shape thereof with a portion at the inner face 22 of the outside pipe member 20 along one side of the rectangular shape while another portion of the outer face 32 along the other side opposing to the one side of the rectangular shape of the inside pipe member 30 contacts with the back face 44 of the magnetic member 40 in such a manner as to cover over the overall area of the back face 44. Consequently, the outer face 32 of the inside pipe member 30 which forms one side of the rectangular shape contacts with and presses against the back face 44 of the magnetic member 40 over the overall length of the back face 44 so that the close contact face 42 of the magnetic member 40 is closely contacted with the inner face 22 of the outside pipe member 20.

With the magnetic scale of the second embodiment described above, similar action and advantages to those of the magnetic scale of the first embodiment can be achieved.

Third Embodiment

Now, a third embodiment of the present invention is described.

Figure 4A:
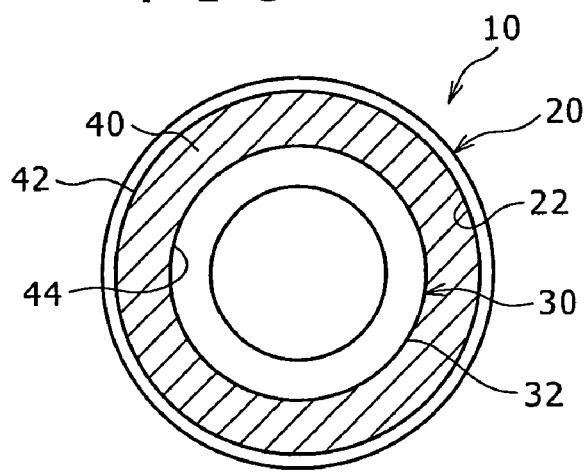
FIG. 4A is a cross sectional view of a magnetic scale according to a third embodiment of the present invention.

FIG. 4A is a cross section view of a magnetic scale of the third embodiment.

The magnetic scale of the third embodiment is similar to the magnetic scale of the first embodiment described hereinabove except that the magnetic member 40 is provided along the overall circumference of the gap between the outside pipe member 20 and the inside pipe member 30.

In particular, the outside pipe member 20 has a cylindrical configuration having a ring-shaped cross section and has an inner face 22 while the inside pipe member 30 has a cylindrical configuration having a ring-shaped cross section having an outer diameter less greater than the inner diameter of the outside pipe member 20 and has an outer face 32.

The inside pipe member 30 is inserted coaxially in the inside of the outside pipe member 20, and the magnetic member 40 is provided such that it closes up the annular gap formed between the inner face 22 of the outside pipe member 20 and the outer face 32 of the inside pipe member 30. In other words, the magnetic member 40 is provided over the overall circumference of the inner face 22 of the outside pipe member 20 and over the overall circumference of the outer face 32 of the inside pipe member 30.

The inside pipe member 30 may be inserted into the inside of the outside pipe member 20 after the magnetic member 40 is assembled to the inner face 22 of the outside pipe member 20, or may be inserted into the outside pipe member 20 after the magnetic member 40 is assembled to the inside pipe member 30.

Where the magnetic member 40 and the inside pipe member 30 are assembled in the inside of the outside pipe member 20, the back face 44 of the magnetic member 40 is covered over the overall area thereof by the outer face 32 of the inside pipe member 30 over the overall area. Further, the back face 44 of the magnetic member 40 is pressed against the outer face 32 of the inside pipe member 30 over the overall area so that the close contact face 42 of the magnetic member 40 is closely contacted with the inner face 22 of the outside pipe member 20 over the overall length of the magnetic member 40.

With the magnetic scale of the third embodiment described above, similar action and advantages to those of the magnetic scale of the first embodiment can be achieved.

Further, with the magnetic scale of the third embodiment, since the magnetic field of the inside pipe member 30 is generated uniformly over the overall area around the center axis of the outside pipe member 20, the position detection apparatus 100 in which the magnetic scale 10 is used can detect a detection signal at whichever position around the center axis of the outside pipe member 20 the magnetic sensor 106 of the detection head 102 is disposed. This is advantageous in assurance of the degree of freedom in arrangement of the magnetic scale 10 and the detection head 102.

Fourth Embodiment

Now, a fourth embodiment of the present invention is described.

Figure 4B:
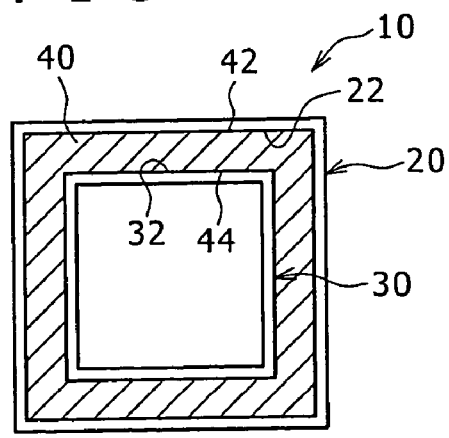
FIG. 4B is a cross sectional view of a magnetic scale according to a fourth embodiment of the present invention.

FIG. 4B shows a cross sectional view of a magnetic scale of the fourth embodiment.

The magnetic scale of the fourth embodiment is a modification to but is different from the magnetic scale of the third embodiment described hereinabove in that only the outside pipe member 20, inside pipe member 30 and magnetic member 40 are different in shape.

In particular, the outside pipe member 20 has a tubular configuration having a cross section of a rectangular framework shape and has an inner face 22 while the inside pipe member 30 has a tubular configuration having a cross section of a rectangular framework shape and has an outer face 32.

The inside pipe member 30 is inserted coaxially in the inside of the outside pipe member 20 (more particularly, the inside pipe member 30 is inserted coaxially such that the four sides of the rectangular shape of the outside pipe member 20 and the four sides of the rectangular shape of the inside pipe member 30 extend in parallel to each other), and the magnetic member 40 is provided such that it closes up a gap of a rectangular framework shape formed between the inner face 22 of the outside pipe member 20 and the outer face 32 of the inside pipe member 30. In other words, the magnetic member 40 is provided over the overall periphery of the inner face 22 of the outside pipe member 20 and over the overall periphery of the outer face 32 of the inside pipe member 30.

The inside pipe member 30 may be inserted into the inside of the outside pipe member 20 after the magnetic member 40 is assembled to the inner face 22 of the outside pipe member 20, or may be inserted into the outside pipe member 20 after the magnetic member 40 is assembled to the inside pipe member 30.

Where the magnetic member 40 and the inside pipe member 30 are assembled in the inside of the outside pipe member 20, the back face 44 of the magnetic member 40 is covered over the overall area thereof by the outer face 32 of the inside pipe member 30 over the overall area. Further, the back face 44 of the magnetic member 40 is pressed against the outer face 32 of the inside pipe member 30 over the overall area so that the close contact face 42 of the magnetic member 40 is closely contacted with the inner face 22 of the outside pipe member 20 over the overall length of the magnetic member 40.

With the magnetic scale of the fourth embodiment described above, similar action and advantages to those of the magnetic scale of the third embodiment can be achieved.

Fifth Embodiment

Now, a fifth embodiment of the present invention is described.

Figure 5A:
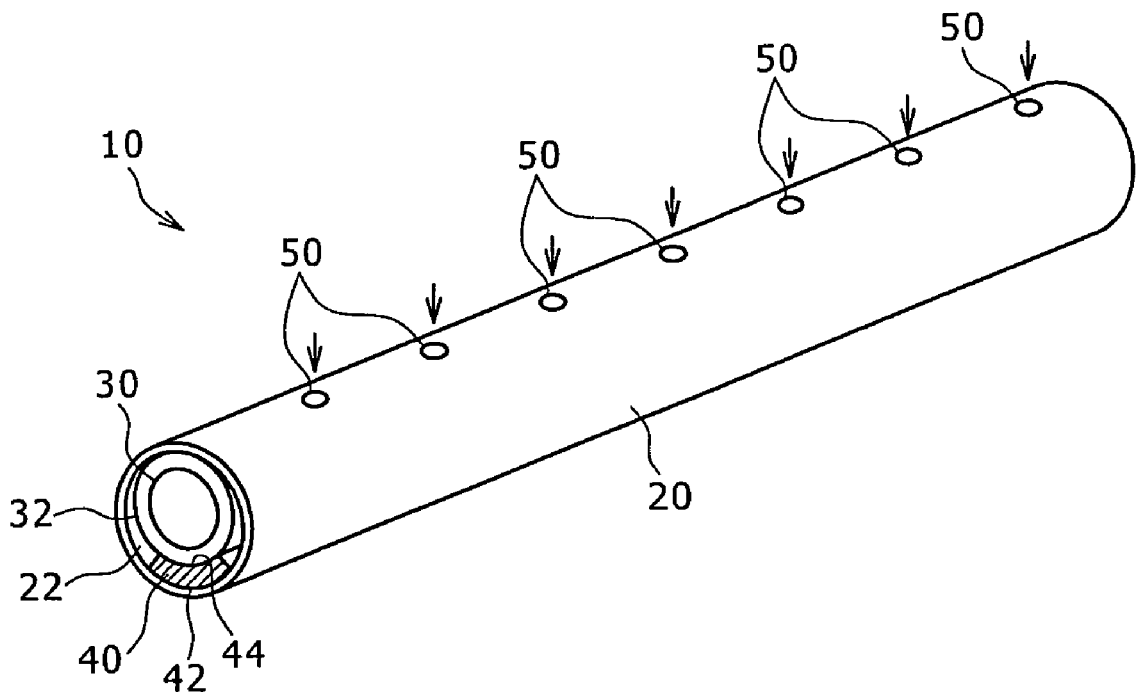
FIG. 5A is a perspective view of a magnetic scale according to a fifth embodiment of the present invention.
Figure 5B:
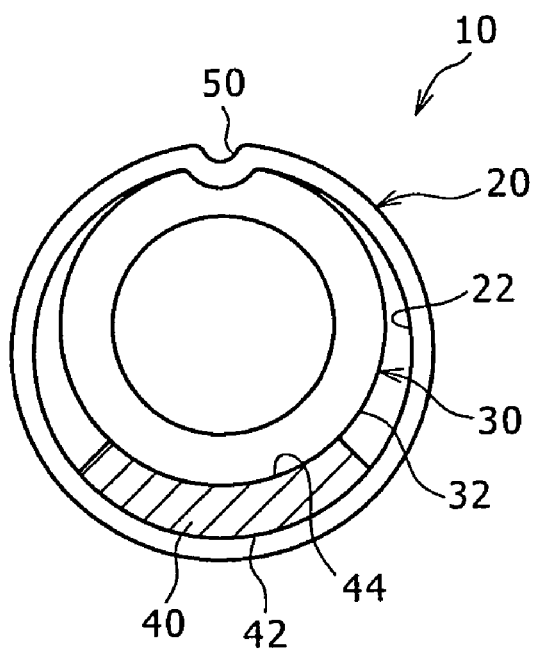
FIG. 5B is a cross sectional view of the magnetic scale of FIG. 5A.

FIG. 5A is a perspective view of a magnetic scale of the fifth embodiment, and FIG. 5B is a cross sectional view of the magnetic scale.

The magnetic scale of the fifth embodiment is a modification to but is different from the magnetic scale of the first embodiment described hereinabove in that a recessed portion 50 is provided on the outside pipe member 20 and the inside pipe member 30 so as to block rotation of the inside pipe member 30 with respect to the outside pipe member 20.

Where the magnetic member 40 and the inside pipe member 30 are assembled in the inside of the outside pipe member 20, the inside pipe member 30 contacts at a portion of the outer face 32 along one side thereof with the inner face 22 of the outside pipe member 20 while another portion of the outer face 32 on the other side opposing to the portion on the one side contacts with the back face 44 of the magnetic member 40 in such a manner as to cover over the overall area of the back face 44. Consequently, the outer face 32 of the inside pipe member 30 contacts with and presses against the back face 44 of the magnetic member 40 over the overall length thereof so that the close contact face 42 of the magnetic member 40 is closely contacted with the inner face 22 of the outside pipe member 20.

A plurality of recessed portions (recessed portions by dowel-driving) 50 are provided in a spaced relationship from each other along the longitudinal direction of the outside pipe member 20. The recessed portions 50 are provided at a portion of on an outer face of the outside pipe member 20 corresponding to a location of the outer face 32 of the inside pipe member 30 on one side at which the outer face 32 contacts with the inner face 22 of the outside pipe member 20 such that they are depressed from the outer face of the outside pipe member 20 to the outer face 32 of the inside pipe member 30. In the present embodiment, the recessed portions 50 are provided in an equally spaced relationship from each other on a straight line parallel to the center axis of the outside pipe member 20 on the outer face of the outside pipe member 20.

With the magnetic scale of the fifth embodiment described above, similar action and advantages to those of the magnetic scale of the first embodiment can be achieved. Further, since the recessed portions 50 are provided, rotation of the inside pipe member 30 in the inside of the outside pipe member 20 can be blocked. This is advantageous in prevention of displacement of the magnetic member 40 in a circumferential direction of the outside pipe member 20.

Different examples of the arrangement of such a recessed portion 50 as described above is described below.

In the example shown in FIGS. 6A and 6B, a plurality of recessed portions 50 are provided in an equally spaced relationship from each other on a straight line parallel to the center axis of the outside pipe member 20 on the outer face of the outside pipe member 20 similarly as in the fifth embodiment.

In the example shown in FIGS. 7A and 7B, a plurality of recessed portions 50 are provided in an equally spaced relationship from each other on two straight lines parallel to the center axis of the outside pipe member 20 on the outer face of the outside pipe member 20.

Where two recessed portions 50 are provided in a spaced relationship from each other in a circumferential direction of the outside pipe member 20 in this manner, rotation of the inside pipe member 30 in the inside of the outside pipe member 20 can be prevented more effectively and advantageously.

In the example of FIGS. 8A and 8B, a plurality of recessed portions 50 are provided in an equally spaced relationship from each other on a straight line parallel to the center axis of the outside pipe member 20 on the outer face of the outside pipe member 20, and two recessed portions 50 are provided in a spaced relationship from each other in a circumferential direction of the outside pipe member 20 only at a portion in the proximity of each of the opposite ends of the outside pipe member 20.

In the present example, since two recessed portions 50 are formed in a spaced relationship from each other in a circumferential direction adjacent each of the opposite ends of the outside pipe member 20 in the longitudinal direction thereby to position the inside pipe member 30 and the magnetic member 40 with respect to the outside pipe member 20 and then the remaining recessed portions 50 are formed, then rotation of the inside pipe member 30 with respect to the outside pipe member 20 can be blocked effectively and advantageously when the inside pipe member 30 and the magnetic member 40 are positioned with respect to the outside pipe member 20.

Sixth Embodiment

Now, a sixth embodiment of the present invention is described.

FIG. 9 is a cross sectional view of a magnetic scale of the sixth embodiment.

The magnetic scale of the sixth embodiment is a modification to but is different from the magnetic scale of the fifth embodiment described hereinabove in that spacers 60 are provided between the inner face 22 of the outside pipe member 20 and the outer face 32 of the inside pipe member 30 to block otherwise possible rotation of the inside pipe member 30 with respect to the outside pipe member 20 with a higher degree of certainty.

Similarly as in the fifth embodiment, where the magnetic member 40 and the inside pipe member 30 are assembled in the inside of the outside pipe member 20, the inside pipe member 30 contacts at a portion of the outer face 32 along one side thereof with the inner face 22 of the outside pipe member 20 while another portion of the outer face 32 on the other side opposing to the portion on the one side contacts with the back face 44 of the magnetic member 40 in such a manner as to cover over the overall area of the back face 44. Consequently, the outer face 32 of the inside pipe member 30 contacts with and presses against the back face 44 of the magnetic member 40 over the overall length of the back face 44 so that the close contact face 42 of the magnetic member 40 is closely contacted with the inner face 22 of the outside pipe member 20.

A plurality of recessed portions (recessed portions by dowel-driving) 50 are provided in a spaced relationship from each other along the longitudinal direction of the outside pipe member 20. The recessed portions 50 are provided at a portion of on an outer face of the outside pipe member 20 corresponding to a location of the outer face 32 of the inside pipe member 30 on one side at which the outer face 32 contacts with the inner face 22 of the outside pipe member 20 such that they are depressed from the outer face of the outside pipe member 20 to the outer face 32 of the inside pipe member 30.

Further, the spacers 60 are interposed at locations between the inside pipe member 30 and the recessed portions 50 in the gap on the opposite sides of the magnetic member 40 in such a manner as to block rotation of the inside pipe member 30 in the inside of the outside pipe member 20.

The disposition of the spacers 60 is performed by mere fitting of the spacers 60 into the gap or using a bonding agent or a double-sided adhesive tape.

With the magnetic scale of the sixth embodiment described above, similar action and advantages to those of the magnetic scale of the fifth embodiment can be achieved. Besides, since the spacers 60 are provided, otherwise possible rotation of the inside pipe member 30 in the inside of the outside pipe member 20 can be prevented with a higher degree of certainty and displacement of the magnetic member 40 in a circumferential direction of the outside pipe member 20 can be prevented advantageously with a higher degree of certainty.

Seventh Embodiment

Now, a seventh embodiment of the present invention is described.

Figure 10A:
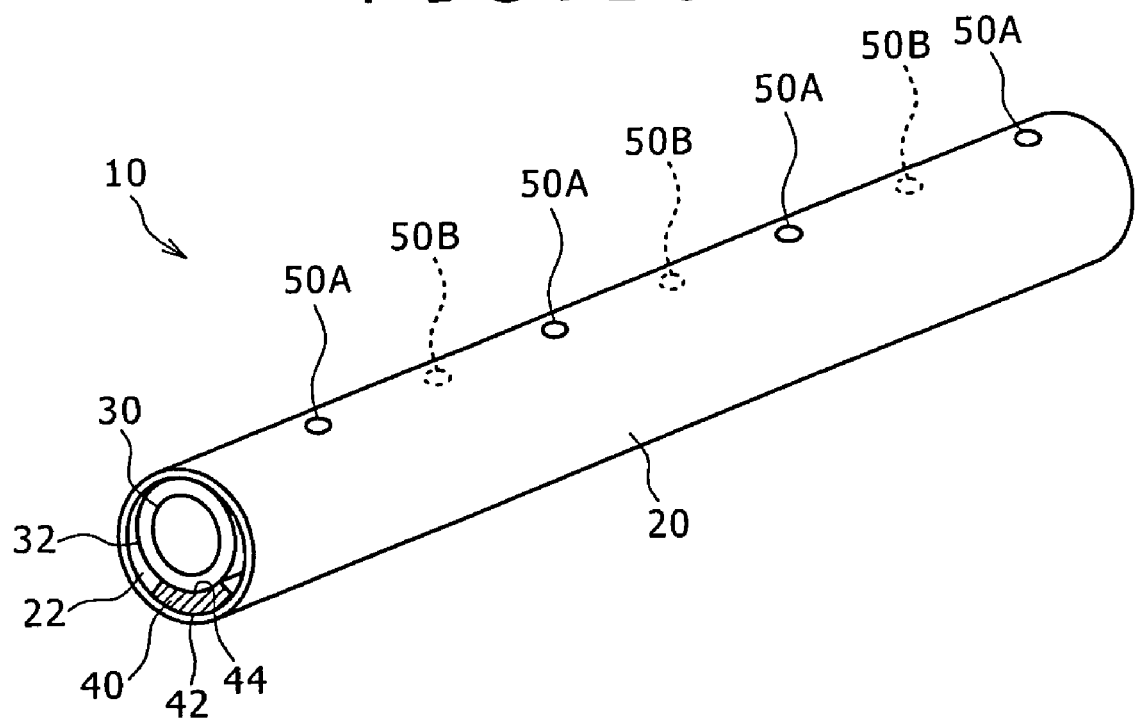
FIG. 10A is a perspective view of a magnetic scale according to a seventh embodiment of the present invention.
Figure 10B:
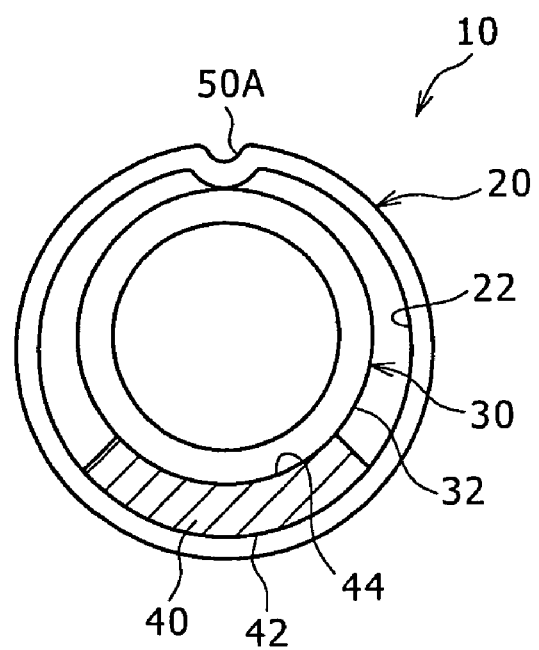
FIG. 10B is a cross sectional view of the magnetic scale of FIG. 10A.

FIG. 10A is a perspective view of a magnetic scale of the seventh embodiment, and FIG. 10B is a cross sectional view of the magnetic scale.

The magnetic scale of the seventh embodiment is a modification to the magnetic scale of the fifth embodiment described hereinabove.

In particular, a plurality of recessed portions (recessed portions by dowel-driving) 50 are formed in a spaced relationship from each other along the longitudinal direction of the outside pipe member 20 such that they are depressed from the outer face of the outside pipe member 20 to the outer face 32 of the inside pipe member 30. Further, the recessed portions 50 on the inside pipe member 30 and the outside pipe member 20 are displaced from each other in the longitudinal direction of the inside pipe member 30 and the outside pipe member 20.

Where, of the recessed portions 50 from the outer face of the outside pipe member 20 to the outer face 32 of the inside pipe member 30, those which are formed on the outside pipe member 20 are denoted by 50A and those which are formed on the inside pipe member 30 are denoted by 50B, the recessed portions 50A formed on the outside pipe member 20 press against portions of the outer face of the inside pipe member 30 at which the recessed portions 50B are not formed in a direction in which the close contact face 42 is closely contacted with the inner face 22 of the outside pipe member 20.

With the magnetic scale of the seventh embodiment described above, similar action and advantages to those of the magnetic scale of the first embodiment can be achieved similarly to the magnetic scale of the fifth embodiment. Besides, rotation of the inside pipe member 30 in the outside pipe member 20 can be prevented by the recessed portions 50A formed on the outside pipe member 20, and displacement of the magnetic member 40 in the circumferential direction and the longitudinal direction of the outside pipe member 20 can be prevented advantageously.

Eighth Embodiment

Now, an eight embodiment of the present invention is described.

Figure 11A:
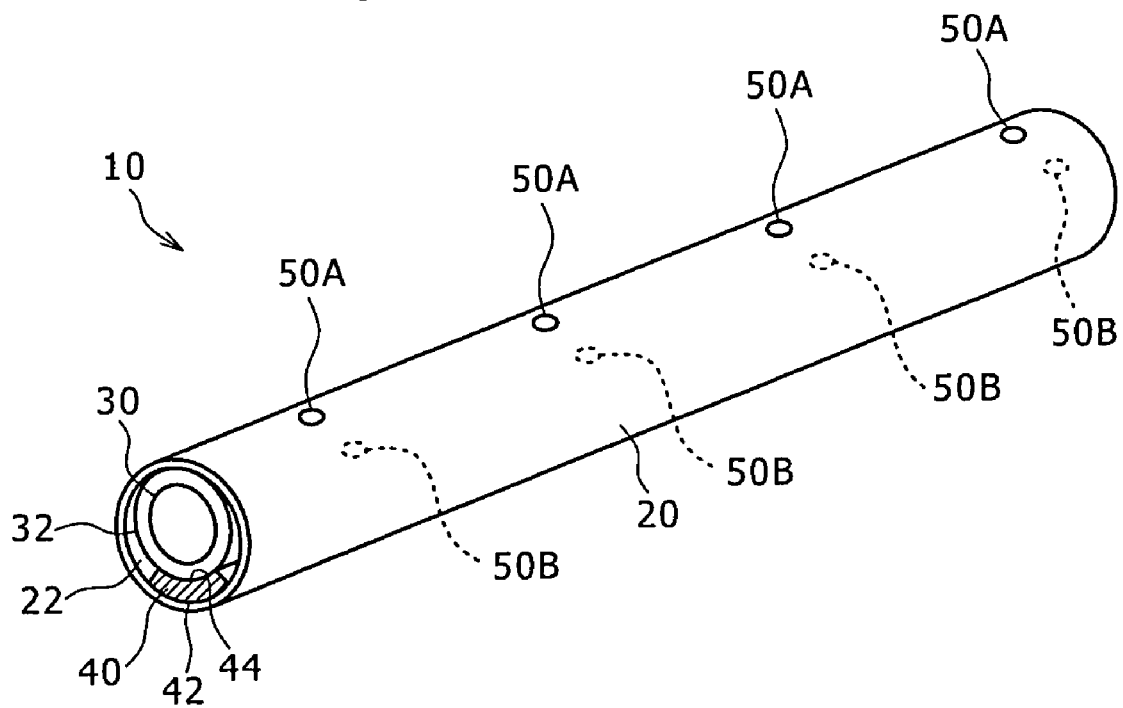
FIG. 11A is a perspective view of a magnetic scale according to an eighth embodiment of the present invention.
Figure 11B:
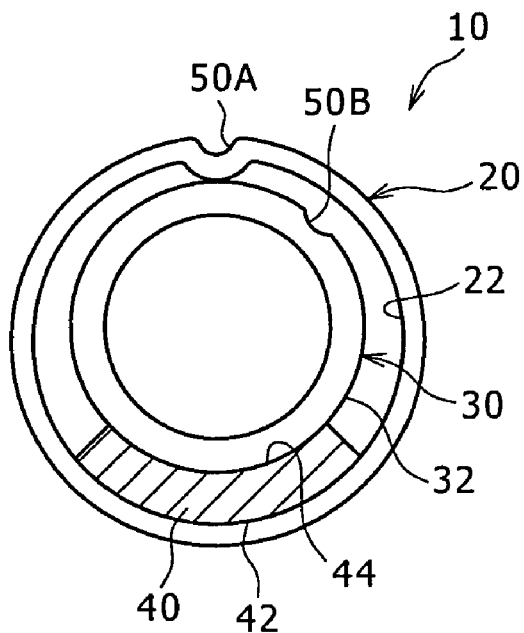
FIG. 11B is a cross sectional view of the magnetic scale of FIG. 11A.

FIG. 11A is a perspective view of a magnetic scale of the eighth embodiment, and FIG. 11B is a cross sectional view of the magnetic scale.

The magnetic scale of the eighth embodiment is a modification to the magnetic scale of the fifth embodiment described hereinabove.

In particular, a plurality of recessed portions 50 are formed in a spaced relationship from each other along the longitudinal direction of the outside pipe member 20 such that they are depressed from the outer face of the outside pipe member 20 to the outer face 32 of the inside pipe member 30. Further, the recessed portions 50 on the inside pipe member 30 and the outside pipe member 20 are displaced from each other in the circumferential direction thereof.

Since the recessed portions 50 are displaced in the circumferential direction in this manner, also with the magnetic scale of the eighth embodiment, the recessed portions 50A formed on the outside pipe member 20 press against portions of the outer face 32 of the inside pipe member 30 at which the recessed portions 50B are not formed in a direction in which the close contact face 42 is closely contacted with the inner face 22 of the inner member 20 similarly as with the magnetic scale of the seventh embodiment.

With the magnetic scale of the eighth embodiment, similar advantages to those of the magnetic scale of the seventh embodiment are achieved.

Ninth Embodiment

Now, a ninth embodiment of the present invention is described.

Figure 12:
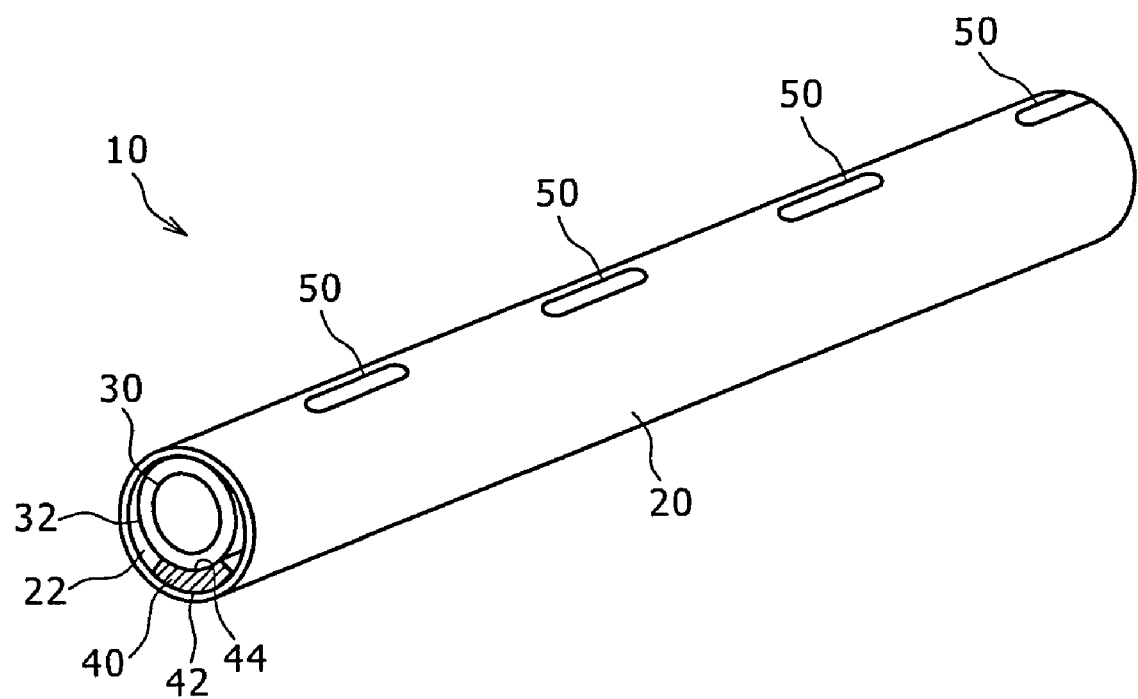
FIG. 12 is a perspective view of a magnetic scale according to a ninth embodiment of the present invention.

FIG. 12 is a perspective view of a magnetic scale of the ninth embodiment.

The magnetic scale of the ninth embodiment is a modification to but is different from the magnetic scale of the fifth embodiment described hereinabove in that the recessed portions 50 are elongated along the longitudinal direction of the outside pipe member 20.

In particular, a single recessed portion 50 may be formed so as to extend over the overall length of the outside pipe member 20 in the longitudinal direction or a plurality of recessed portions 50 having a predetermined length are formed in a spaced relationship from each other in the longitudinal direction of the outside pipe member 20.

With the magnetic scale of the ninth embodiment, similar advantages to those of the magnetic scale of the first embodiment are achieved similarly to the magnetic scale of the fifth embodiment. Further, otherwise possible rotation of the inside pipe member 30 in the inside of the outside pipe member 20 can be prevented by the recessed portions 50, and displacement of the magnetic member 40 in the circumferential direction of the outside pipe member 20 can be prevented advantageously.

Tenth Embodiment

Now, a tenth embodiment of the present invention is described.

Figure 13A:
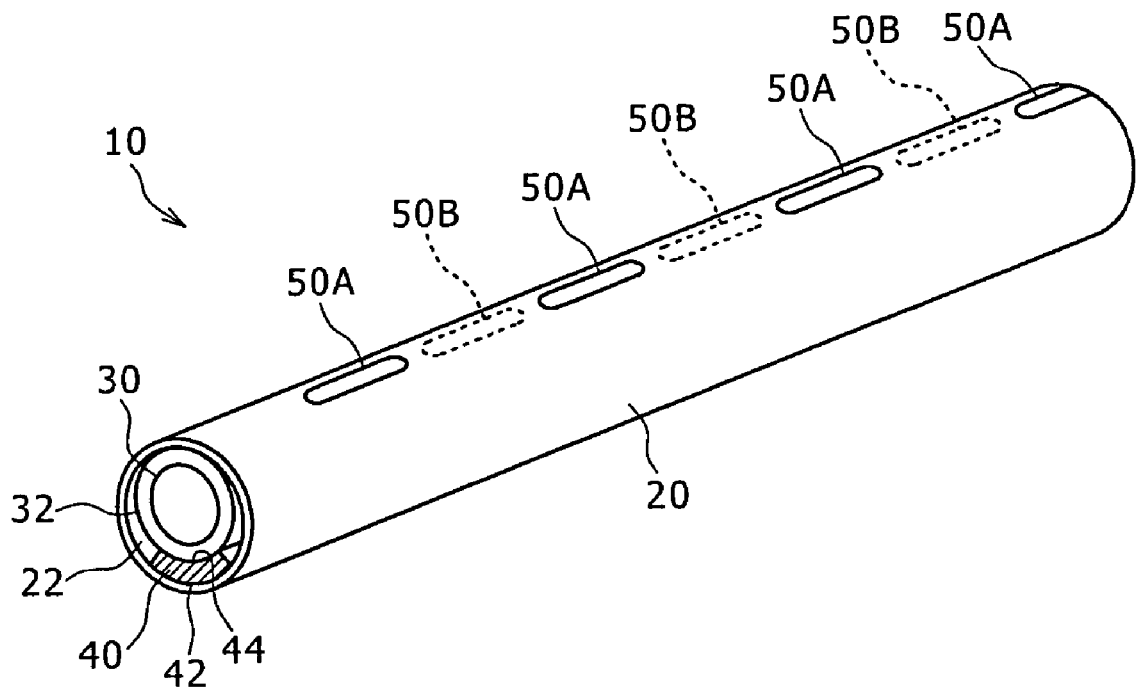
FIG. 13A is a perspective view of a magnetic scale according to a tenth embodiment of the present invention.
Figure 13B:
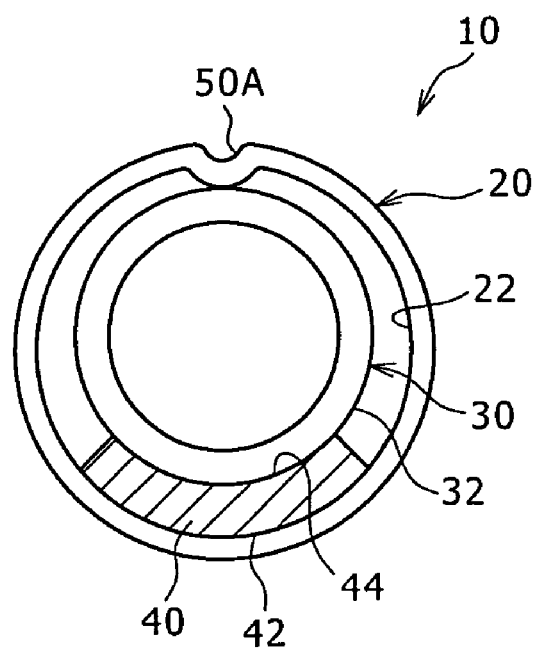
FIG. 13B is a cross sectional view of the magnetic scale of FIG. 13A.

FIG. 13A is a perspective view of a magnetic scale of the tenth embodiment, and FIG. 13B is a cross sectional view of the magnetic scale.

The magnetic scale of the tenth embodiment is a modification to the magnetic scale of the ninth embodiment described hereinabove.

In particular, a plurality of recessed portions 50 are formed in a spaced relationship from each other along the longitudinal direction of the outside pipe member 20 and each extends by a predetermined length along the longitudinal direction of the outside pipe member 20. Further, the recessed portions 50 on the inside pipe member 30 and the outside pipe member 20 are displaced from each other in the longitudinal direction of the inside pipe member 30 and the outside pipe member 20.

Where, of the recessed portions 50 from the outer face of the outside pipe member 20 to the outer face 32 of the inside pipe member 30, those which are formed on the outside pipe member 20 are denoted by 50A and those which are formed on the inside pipe member 30 are denoted by 50B, the recessed portions 50A formed on the outside pipe member 20 press against portions of the outer face of the inside pipe member 30 at which the recessed portions 50B are not formed in a direction in which the close contact face 42 is closely contacted with the inner face 22 of the outside pipe member 20.

With the magnetic scale of the tenth embodiment described above, similar action and advantages to those of the magnetic scale of the first embodiment can be achieved similarly to the magnetic scale of the fifth embodiment. Besides, rotation of the inside pipe member 30 in the outside pipe member 20 can be prevented by the recessed portions 50A formed on the outside pipe member 20, and displacement of the magnetic member 40 in the circumferential direction and the longitudinal direction of the outside pipe member 20 can be prevented advantageously.

Eleventh Embodiment

Now, an eleventh embodiment of the present invention is described.

Figure 14A:
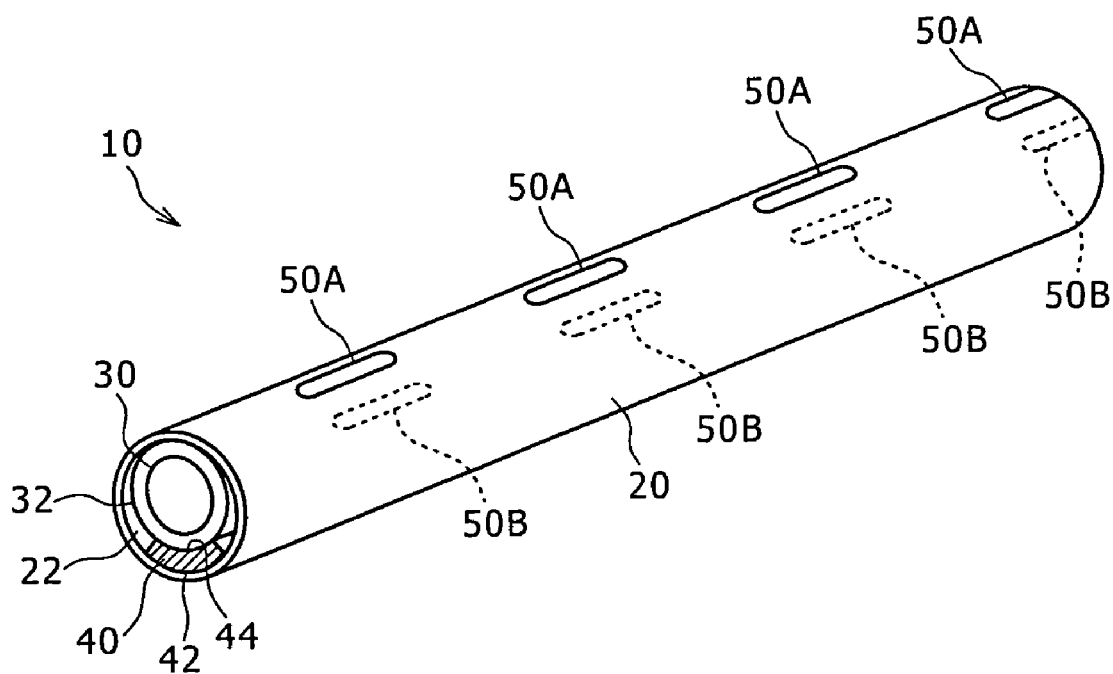
FIG. 14A is a perspective view of a magnetic scale according to an eleventh embodiment of the present invention.
Figure 14B:
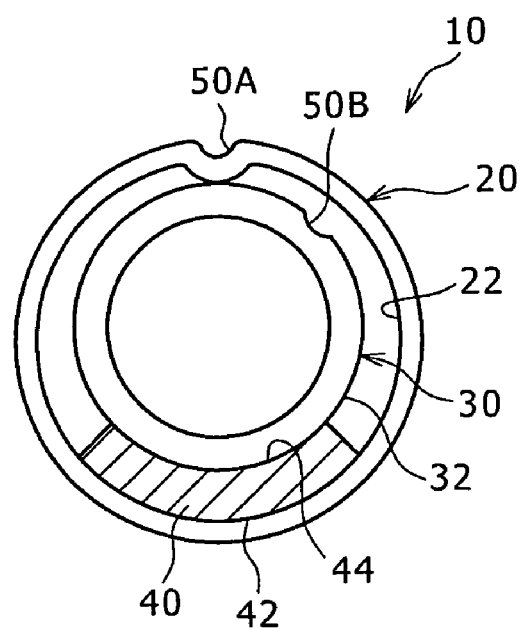
FIG. 14B is a cross sectional view of the magnetic scale of FIG. 14A.

FIG. 14A is a perspective view of a magnetic scale of the eleventh embodiment, and FIG. 14B is a cross sectional view of the magnetic scale.

The magnetic scale of the eleventh embodiment is a modification to the magnetic scale of the ninth embodiment described hereinabove.

In particular, a plurality of recessed portions 50 are formed in a spaced relationship from each other along the longitudinal direction of the outside pipe member 20 and each extends by a predetermined length along the longitudinal length of the outside pipe member 20. Further, the recessed portions 50 on the inside pipe member 30 and the outside pipe member 20 are displaced from each other in the circumferential direction thereof.

Since the recessed portions 50 are displaced in the circumferential direction in this manner, also with the magnetic scale of the eleventh embodiment, the recessed portions 50A formed on the outside pipe member 20 press against portions of the outer face 32 of the inside pipe member 30 at which the recessed portions 50B are not formed in a direction in which the close contact face 42 is closely contacted with the inner face 22 of the outside pipe member 20 similarly as with the magnetic scale of the tenth embodiment.

With the magnetic scale of the eleventh embodiment, similar advantages to those of the magnetic scale of the tenth embodiment are achieved.

Twelfth Embodiment

Now, a twelfth embodiment of the present invention is described.

Figure 15:
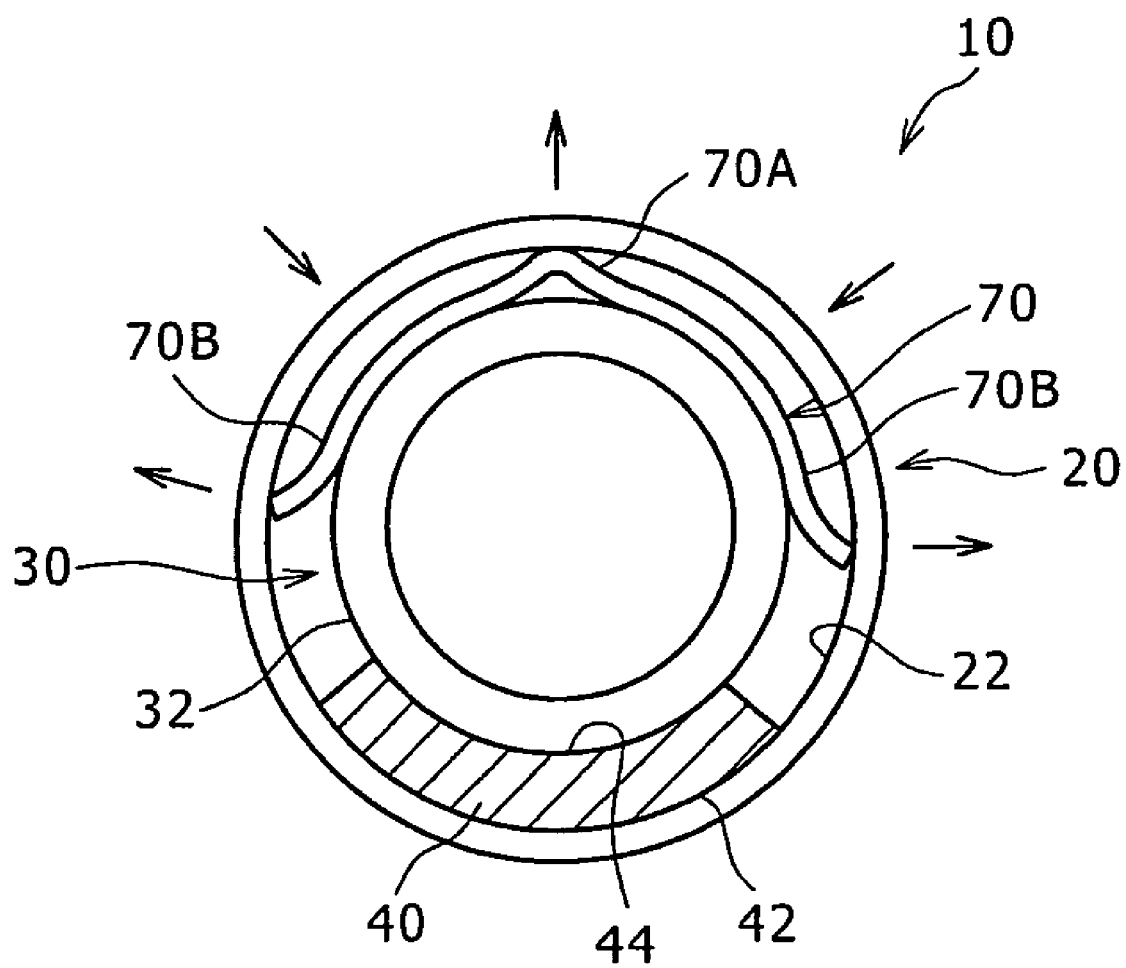
FIG. 15 is a sectional view of a magnetic scale according to a twelfth embodiment of the present invention.

FIG. 15 is a sectional view of a magnetic scale of the twelfth embodiment.

The magnetic scale of the twelfth embodiment is similar to but different from the magnetic scale of the first embodiment described hereinabove in that a resilient member 70 is provided between the inner face 22 of the outside pipe member 20 and the outer face 32 of the inside pipe member 30 such that it biases the inside pipe member 30 in a direction toward the magnetic member 40 to closely contact with the close contact face 42 of the magnetic member 40 with the inner face 22 of the outside pipe member 20.

In particular, where the magnetic member 40 and the inside pipe member 30 are assembled in the inside of the outside pipe member 20, the inside pipe member 30 covers at a portion of the outer face 32 on one side thereof with the back face 44 of the magnetic member 40 in such a manner as to cover over the overall area of the back face 44 while a gap is formed between a portion of the outer face 32 on the opposite side, which is positioned remotely from the magnetic member 40, and the inner face 22 of the outside pipe member 20.

The resilient member 70 is disposed in the gap such that it contacts with both of the inner face 22 of the outside pipe member 20 and the outer face 32 of the inside pipe member 30 to exert resilient force.

The resilient member 70 has a central portion 70A and a pair of arm portions 70B extending from the opposite sides of the central portion 70A and contacts at end portions of the central portion 70A and the arm portions 70B thereof with the inner face 22 of the outside pipe member 20 while intermediate portions of the arm portions 70B contact with the outer face 32 of the inside pipe member 30 to press against the inside pipe member 30 in a direction toward the magnetic member 40. The magnetic member 40 is pressed by the resilient force of the resilient member 70 such that the close contact face 42 thereof is closely contacted with the inner face 22 of the outside pipe member 20.

With the magnetic scale of the twelfth embodiment described above, similar action and advantages to those of the magnetic scale of the first embodiment can be achieved.

It is to be noted that, while, in the embodiments described above, a rubber magnet is used as the magnetic member 40, the magnetic member is not limited to this, but any magnetizable member such as, for example, a plastic magnet, a member to which a magnetic substance is applied, a magnetic member containing rare earth metal or a magnetic member containing ferrite can be applied as the magnetic member 40.

Further, disposition of the magnetic member 40 may be performed naturally by mixing a magnetic material in the form of powder or liquid with a binder or a hardening agent and pouring the mixture into the space between the outside pipe member 20 and the inside pipe member 30 to mold the mixture into a desired shape.

Further, while each of the outside pipe member 20 and the inside pipe member 30 in the embodiments described above has a ring-shaped cross section or a cross section of a rectangular framework shape, each of the outside pipe member 20 and the inside pipe member 30 may have any hollow sectional shape such as a polygonal framework shape.

While preferred embodiments of the present invention have been described using specific terms, such description is for illustrative purposes only, and it is to be understood that changes and variations may be made without departing from the spirit or scope of the following claims.

What is claimed is:

1. A magnetic scale, comprising:
an outside pipe member;
an inside pipe member inserted in the inside of said outside pipe member such that at least a portion of an outer-most face of the inside pipe member is positioned in a spaced relationship to an inner-most face of the outside pipe member so as to form a gap between the outside and inside pipes, the inside pipe member having an outer circumference less than the inner circumference of said outside pipe member in order to allow for the gap to be formed; and
a magnetic member in contact with the inside face of said outside pipe member and the outside face of said inside pipe member and extending in a linear direction, said magnetic member being inserted at least partially in the gap between the inner-most face of said outside pipe member and the outer-most face of said inside pipe member in such a manner as to extend in parallel to a longitudinal direction of said inside and outside pipe members, said magnetic member having a magnetic graduation formed thereon and magnetized alternately with N poles and S poles along the longitudinal direction thereof.

2. The magnetic scale according to claim 1, wherein said magnetic member is in the form of a band plate and one of the opposite faces of said magnetic member in the thicknesswise direction faces and abuts the inside pipe member, and the other of the opposite faces of the magnetic member faces and abuts the outside pipe member.

3. The magnetic scale according to claim 2, wherein a plurality of recessed portions are provided in a spaced relationship from each other in the longitudinal direction of said outside pipe member, and wherein a corresponding recesses are formed in the longitudinal direction of said inside pipe member such that the recesses formed on the outside pipe member interface with the recesses formed on the inside pipe member.

4. The magnetic scale according to claim 3, wherein a pair of spacers is interposed between said inside pipe member and said outside pipe member and located on the opposite sides of said magnetic member in said gap in such a manner as to block rotation of said inside pipe member in the inside of said output pipe member.

5. The magnetic scale according to claim 2, wherein a plurality of recessed portions are formed in a spaced relationship from each other along the longitudinal direction of both said outside pipe member at a portion of the outer face of said outside pipe member and said inside pipe member at a portion of the outer face of said inside pipe member, the recessed portions on said inside pipe member and said outside pipe member being displaced from each other in the longitudinal direction of said inside pipe member and said outside pipe member, the recessed portions formed on said outside pipe member pressing against portions of the outer face of said inside pipe member at which the recessed portions are not formed.

6. The magnetic scale according to claim 2, wherein a plurality of recessed portions are formed in a spaced relationship from each other along the longitudinal direction of both said outside pipe member at a portion of the outer face of said outside pipe member and said inside pipe member at a portion of the outer face of said inside pipe member, the recessed portions on said inside pipe member and said outside pipe member being displaced from each other in the circumferential direction of said inside pipe member and said outside pipe member, the recessed portions formed on said outside pipe member pressing against portions of the outer face of said inside pipe member at which the recessed portions are not formed.

7. The magnetic scale according to claim 2, wherein a recessed portion is formed and extends along the longitudinal direction of said outside pipe member at a portion of the outer face of said outside pipe member, in such a manner as to be depressed from the outer face of said outside pipe member to the outer face of said inside pipe member.

8. The magnetic scale according to claim 2, wherein a recessed portion is formed and extends a predetermined distance along the longitudinal direction of both said outside pipe member at a portion of the outer face of said outside pipe member and said inside pipe member at apportion of the outer face of said inside pipe member, the recessed portion on said inside pipe member and said outside pipe member being displaced from each other in the longitudinal direction of said inside pipe member and said outside pipe member, the recessed portion formed on said outside pipe member pressing against portions of the outer face of said inside pipe member at which the recessed portion is not formed.

9. The magnetic scale according to claim 2, wherein a recessed portion is formed and extends a predetermined distance along the longitudinal direction of both said outside pipe member at a portion of the outer face of said outside pipe member and said inside pipe member at a portion of the outer face of said inside pipe member, the recessed portion on said inside pipe member and said outside pipe member being displaced from each other in the circumferential direction of said inside pipe member and said outside pipe member, the recessed portion formed on said outside pipe member pressing against portions of the outer face of said inside pipe member at which the recessed portion is not formed.

10. The magnetic scale according to claim 1, wherein the gap extends continuously over the overall circumference of the inner face of said outside pipe member and the outer face of said inside pipe member, and said magnetic member is provided over the overall circumference of the interface between the first and second pipe members so as to close up the gap.

11. The magnetic scale according to claim 1, wherein said outside pipe member is formed from a nonmagnetic material.

12. The magnetic scale according to claim 1, wherein said inside pipe member is formed from a magnetic material so as to raise the magnetic field strength of the magnetic member.

13. The magnetic scale according to claim 1, wherein each of said outside pipe member and said inside pipe member has a ring-shaped cross section.

14. The magnetic scale according to claim 1, wherein each of said outside pipe member and said inside pipe member has a cross section of a rectangular framework shape.

15. The magnetic scale according to claim 1, further comprising:
    a resilient member provided opposite said magnetic member in said gap between said inside and outside pipe members for resiliently pressing said inside pipe member against said magnetic member.

16. The magnetic scale according to claim 15, wherein said outside pipe member is formed from a nonmagnetic material.

17. The magnetic scale according to claim 15, wherein said inside pipe member is formed from a magnetic material so as to raise the magnetic field strength of the magnetic member.

18. The magnetic scale according to claim 15, wherein each of said outside pipe member and said inside pipe member has a ring-shaped cross section.

19. The magnetic scale according to claim 15, wherein each of said outside pipe member and said inside pipe member has a cross section of a rectangular framework shape.

20. The magnetic scale according to claim 1, wherein said inside pipe member presses said magnetic member against an inner face of said outside pipe member.

21. The magnetic scale according to claim 1, wherein said magnetic member extends substantially the entire length of the overlap between the inside pipe member and the outside pipe member in the longitudinal direction.

22. The magnetic scale according to claim 1, wherein said magnetic member contains no non-magnetic portions.

23. The magnetic scale according to claim 1, wherein at least half of the outer-most face of the inside pipe member is positioned in a spaced relationship from the inner-most face of the outside pipe member.

24. The magnetic scale according to claim 1, wherein the entire outer-most face of the inside pipe member is positioned in a spaced relationship from the inner-most face of the outside pipe member.

25. A method of detecting a relative position in a longitudinal direction of a magnetic scale, the method comprising:
    providing an outside pipe member;
    inserting an inside pipe member in the inside of said outside pipe member such that at least a portion of an outer-most face of the inside pipe member is positioned in a spaced relationship to an inner-most face of the outside pipe member so as to form a gap between the outside and inside pipes, the inside pipe member having an outer circumference less than the inner circumference of said outside pipe member in order to allow for the gap to be formed;
    providing a magnetic member in contact with the inside face of said outside pipe member and the outside face of said inside pipe member and extending in a linear direction, said magnetic member being placed at least partially in the gap between the inner-most face of said outside pipe member and the outer-most face of said inside pipe member in such a manner as to extend in parallel to a longitudinal direction of said inside and outside pipe members, said magnetic member having a magnetic graduation formed thereon and magnetized alternately with N poles and S poles along the longitudinal direction thereof,
    providing a detection head including a magnetic sensor attached to the outside pipe, and
    outputting a detection signal from the detection head as the detection head moves along the outside pipe.

* * * * *